(12) United States Patent
Hofströßler et al.

(10) Patent No.: US 12,257,762 B2
(45) Date of Patent: Mar. 25, 2025

(54) METHOD FOR PRODUCING A HOLLOW PROFILE COMPONENT, MOLD TOOL AND HOLLOW PROFILE COMPONENT

(71) Applicant: Odenwald-Chemie GmbH, Schönau (DE)

(72) Inventors: Patrick Hofströßler, Wiesenbach (DE); Kevin Friebel, Neunkirchen (DE); Boris Benzus, Heidelberg (DE); Dominik Hotz, Schönau (DE)

(73) Assignee: Odenwald-Chemie GmbH, Schönau (DE)

( * ) Notice: Subject to any disclaimer, the term of this patent is extended or adjusted under 35 U.S.C. 154(b) by 216 days.

(21) Appl. No.: 17/595,231

(22) PCT Filed: May 7, 2020

(86) PCT No.: PCT/EP2020/062695
§ 371 (c)(1),
(2) Date: Nov. 11, 2021

(87) PCT Pub. No.: WO2020/233996
PCT Pub. Date: Nov. 26, 2020

(65) Prior Publication Data
US 2022/0314522 A1 Oct. 6, 2022

(30) Foreign Application Priority Data
May 17, 2019 (DE) .................. 10 2019 113 056.5

(51) Int. Cl.
*B29C 51/26* (2006.01)
*B29C 51/00* (2006.01)
(Continued)

(52) U.S. Cl.
CPC .......... *B29C 51/267* (2013.01); *B29C 51/004* (2013.01); *B29C 51/082* (2013.01);
(Continued)

(58) Field of Classification Search
None
See application file for complete search history.

(56) References Cited

U.S. PATENT DOCUMENTS

2012/0286445 A1* 11/2012 Ohta .................. B29C 44/1233
425/111
2019/0061286 A1 2/2019 Giehl et al.

FOREIGN PATENT DOCUMENTS

DE        4442014 A1    6/1995
DE    102009059975 A1    6/2011
(Continued)

OTHER PUBLICATIONS

JP2000073895A_machine_translation (Year: 2006).*
European Patent Office; International Search Report; Aug. 12, 2020; entire document.

*Primary Examiner* — Michael N Orlando
*Assistant Examiner* — Abhishek A Patwardhan
(74) *Attorney, Agent, or Firm* — Price Heneveld LLP

(57) ABSTRACT

A method for producing a channel-shaped hollow profile component from a nonwoven material includes providing first and second nonwoven material layers arranging the first and second nonwoven material layers in a mold tool having first and second mold tool halves and a core body wherein a formation of the first and second nonwoven material layers and the core body is arranged between the first and second mold tool halves, and wherein the core body is arranged between the first and second nonwoven material layers in the formation, and simultaneously forming the first and second nonwoven material layers in the mold tool to form a first nonwoven partial shell and a second nonwoven partial shell.

24 Claims, 14 Drawing Sheets

(51) Int. Cl.
  *B29C 51/08* (2006.01)
  *B29C 51/30* (2006.01)
  *B29C 65/02* (2006.01)
  *B29L 23/00* (2006.01)
  *D04H 1/558* (2012.01)
  *D04H 1/76* (2012.01)

(52) U.S. Cl.
  CPC ............ *B29C 51/30* (2013.01); *B29C 65/028* (2013.01); *D04H 1/558* (2013.01); *D04H 1/76* (2013.01); *B29K 2995/0002* (2013.01); *B29L 2023/00* (2013.01)

(56) References Cited

FOREIGN PATENT DOCUMENTS

| | | | |
|---|---|---|---|
| DE | 102010034159 A1 | | 2/2012 |
| DE | 102012101724 B4 | | 2/2017 |
| DE | 102017106521 A1 | | 9/2018 |
| EP | 3225728 B1 | | 6/2020 |
| JP | H11343938 A | | 12/1999 |
| JP | 2000073895 A | * | 3/2000 ....... F02M 35/10144 |
| WO | 20071004651 A1 | | 9/2007 |
| WO | 2012015583 A1 | | 2/2012 |
| WO | 2015091355 A1 | | 6/2015 |

* cited by examiner

METHOD FOR PRODUCING A HOLLOW PROFILE COMPONENT, MOLD TOOL AND HOLLOW PROFILE COMPONENT

BACKGROUND OF THE INVENTION

The present invention relates to a method for producing a hollow profile component, a mold tool and a hollow profile component.

Hollow profile components, in particular in the form of channel-shaped hollow profile components, are sufficiently known from the prior art. For example, an acoustic diffuser is known in the automotive industry which is such a channel-like hollow profile component. Therein, such a channel-like hollow profile component can preferably have a generally curved course along a main extension direction or preferred direction and a structured or profiled course at its channel-like wall.

Typically, such hollow profile components are produced as foam channels by blow molding in one piece or in a twinsheet process.

Alternatively, it is known to manufacture half-shell profiles, which in turn are joined together in a subsequent method step via a corresponding flange area. The resulting hollow profile components have a protruding flange area, which is generally critical from the point of view of installation space economy. Such hollow profile components can alternatively also be manufactured as injection-molded parts in one piece or in several pieces. If the hollow profile component is made in several parts, the individual parts are welded or clipped together. In addition, the half-shell profiles must be stored temporarily before they are joined together in a complex joining process.

It is an object of the present invention to provide a method or a mold tool with which an improved hollow profile component can be realized, in particular with respect to the manufacturing costs, the component quality, the economy of installation space and the manufacturing speed.

Further advantages and features of the invention will be apparent from the subclaims as well as the description and the accompanying figures.

SUMMARY OF THE INVENTION

According to a first aspect of the present invention, there is provided a method for producing a hollow profile component, in particular a channel-shaped hollow profile component, from a nonwoven material, comprising:

providing a first nonwoven material layer and a second nonwoven material layer, arranging the first nonwoven material layer and the second nonwoven material layer in a mold tool having a first mold tool half, a second mold tool half and a core body, wherein a formation of the first nonwoven material, the second nonwoven material and the core body is arranged between the first mold tool half and the second mold tool half, wherein the core body is arranged between the first nonwoven material layer and the second nonwoven material layer in the formation, and forming, in particular simultaneously forming, the first nonwoven material layer and the second nonwoven material layer in the mold tool to form a first nonwoven partial shell and/a second nonwoven partial shell.

Compared to the prior art, it is provided according to the invention that the first nonwoven material layer and the second nonwoven material layer are formed together in a mold tool using a core body arranged between them, in particular are formed by pressing. By this forming, it is advantageously possible to transfer both the first and the second nonwoven material layers into a first nonwoven partial shell and a second nonwoven partial shell, which subsequently only have to be joined together for the subsequent formation of the hollow profile component. In particular, the core body serves as an abutment for the first mold tool half and for the second mold tool half, respectively. In particular, the first nonwoven material layer is pressed against the core body in the mold tool in such a way that the first nonwoven partial shell is formed. The same applies to the second nonwoven material layer and the second nonwoven partial shell. In other words, the outer contour of the core body preferably provides, in the sense of a placeholder in the molding tool, the shaping for the hollow profile component which is later manufactured, in particular for its hollow region. In this context, it is preferably provided that the first nonwoven partial shell and the second nonwoven partial shell are a first nonwoven half shell and a second nonwoven half shell, so that only two components need to be joined to one another in order to produce a hollow profile component. However, it is also conceivable that a plurality of first nonwoven partial shells and a plurality of second nonwoven partial shells are joined together to form a closed perimeter in at least one cutting plane through the hollow profile component. Preferably, it is provided that the hollow profile component is channel-shaped. That is, the hollow profile component has openings on the end faces, preferably the hollow profile component extending between the two openings along a general course which may, for example, be rectilinear and/or curved, wherein in particular between the two openings the circumference is closed in a plane lying perpendicular to the general course, in particular along the entire extension along the general course. Such channel-shaped hollow profile components can be used in an advantageous manner for guiding gas or air in vehicles, in particular as acoustic diffusers. Alternatively or additionally, it is conceivable that the hollow profile component has side and/or lateral openings (relative to the general course).

Furthermore, it is preferably provided that a hollow portion (measured with respect to an outer surface of the hollow profile component to be associated with the hollow portion) of the hollow profile component constitutes a proportion of less than 25%, preferably less than 15% and more preferably a proportion of less than 10% of the entire hollow profile component (measured with respect to the outer surface). For example, the hollow profile component is a component installed in the footwell area of a vehicle. In particular, it proves advantageous that by means of the method the first nonwoven partial shell and the second nonwoven partial shell can be manufactured simultaneously, thereby accelerating the manufacturing process of the hollow profile component. Furthermore, the method allows the possibility of forming a dimensionally stable first nonwoven partial shell and/or a dimensionally stable second nonwoven partial shell from a first nonwoven material layer and a second nonwoven material layer, which are suitable for providing a dimensionally stable or rigid hollow profile component. This proves to be advantageous, in particular, because a hollow profile component made of a nonwoven fabric or nonwoven material is less expensive and also lighter than a structurally identical hollow profile component made of a plastic, which is generally produced by a blow molding process or, for forming channels of foam, by a twinsheet process. Furthermore, a hollow profile component made of nonwoven fabric has considerable advantages with regard to its acoustic effectiveness, its air permeability and/or its thermal insulation, in particular in comparison with such hollow profile components which are manufactured from synthetic material or foam. In particular, the usual procedures for forming hollow profile components, in which, for example, a profiling is specified using a vacuum, are dispensed with. In particular, in the case of nonwoven materials, a film would be required in this case, which would be laminated to the nonwoven material and can typically tear during stretching. In particular, it has been found that even with a high vacuum, it is not possible to properly form a suitable first nonwoven partial shell and a second nonwoven partial shell.

Accordingly, the method with the core body offers a possibility of efficiently realizing a hollow profile component made of a nonwoven material from a first and a second nonwoven material layer. In this case, in particular the inner side of the first mold tool half and/or the inner side of the second mold tool half is designed as a negative mold, and the core body serves in particular as an internal punch or abutment which is arranged between the first mold tool half and the second mold tool half during the pressing process. Preferably, the core body is configured as a separate component in the mold tool. For example, the core body comprises handles that protrude from the mold tool during the pressing operation and after the pressing operation, so as to allow easy removal or insertion of the core body. The feeding of the first nonwoven layer and the second nonwoven layer, the removal of the core body or its insertion between the first mold half and the second mold half and/or the removal of the hollow profile component may be performed manually or automatically. For example, the first nonwoven fabric layer and the second nonwoven fabric layer are provided as roll material or as a blank.

Furthermore, it is preferably provided that the first nonwoven fabric layer and/or the second nonwoven fabric layer is provided with at least one opening during forming, wherein the opening is particularly preferably punched or pinned with the core body during forming. In this case, the opening is not formed at the edge of the first nonwoven fabric layer and/or of the second nonwoven fabric layer, but is arranged offset towards the interior and then forms, for example, a window-like or hatch-like lateral opening in the finished state of the hollow profile component. For this purpose, a corresponding section is formed on the outside of the core body or of the first and/or second mold tool half, which section is suitable for punching out the opening. For example, this is a blade-like protrusion against which the first nonwoven fabric layer and/or the second nonwoven fabric layer is pressed during forming in order to punch out the opening.

In particular, the first nonwoven fabric layer and the second nonwoven fabric layer are heated in a preparatory step, for example in an oven, a hot press, a microwave, and/or a radiant field. It is also conceivable that the first nonwoven fabric layer and/or the second nonwoven fabric layer are heated by means of a friction process. Subsequently, the still warm or hot first nonwoven fabric layer and/or second nonwoven fabric layer is introduced into the mold tool. Thus, it is advantageously possible to permanently form the heated first and/or second nonwoven fabric layer by compression molding.

Preferably, it is provided that the first nonwoven fabric layer and/or the second nonwoven fabric layer comprises a binder. In particular, the binder is configured to liquefy under the influence of heat. As a result, it is advantageously possible to realize a materially bonded connection between the first nonwoven partial shell the second nonwoven partial shell, in which the regions of the first nonwoven partial shell and of the second nonwoven partial shell that have been heated up in the later flange section are brought into contact and are correspondingly materially bonded to one another via the binder. Moreover, the heated first or second nonwoven fabric layer can be deformed in the heated state, that is, when the binder is liquid, and a dimensionally stable and rigid first and/or second nonwoven fabric layer is provided after the binder has hardened. For example, the first nonwoven fabric layer and/or the second nonwoven fabric layer is a thermally deformable material composed, for example, of natural fibers, a mixture of cotton fibers and/or plastic fibers and is preferably provided in a single or multilayer structure. The use of glass fibers is also conceivable. In this case, the first nonwoven fabric layer and/or the second nonwoven fabric layer can be composed of individual fibers or mixed fibers.

It is also conceivable that the first nonwoven partial shell and the second nonwoven partial shell are joined to each other without a flange section, for example via an externally abutting film.

According to a preferred embodiment of the present invention, it is provided that after forming the first nonwoven partial shell and the second nonwoven partial shell are joined together in the mold tool. In this way, it is advantageously possible to realize the hollow profile component immediately following the forming operation by joining the first nonwoven partial shell to the second nonwoven partial shell. For example, it is conceivable that the first nonwoven partial shell and the second nonwoven partial shell are bonded and/or welded to one another, that is, in particular are bonded to one another in a materially bonded manner. Advantageously, in this way it is possible to avoid storage of the individually produced nonwoven partial shells, as is customary, for example, in the usual procedure for producing hollow profile components made of plastic. In particular, the first nonwoven partial shell and the second nonwoven partial shell are joined to one another in a materially bonded manner by closing the mold again without a core body and pressing the first mold half and the second mold half onto one another, while sections projecting from the first nonwoven partial shell and the second nonwoven partial shell are arranged between the first mold tool half and the second mold tool half, which are pressed onto one another.

In particular, it is provided that the core body is removed from the mold tool prior to the joining. In particular, it is provided therein that after the forming process the mold tool is first reopened so that the first mold tool half is spaced apart from the second mold tool half. Preferably, it is provided that the first nonwoven material layer is adhered or remains adhered to the first mold tool half, in particular because of a corresponding fixing means on the first mold tool half. Furthermore, it is preferably provided that the first nonwoven partial shell is fixed or remains fixed for a short time to the first mold tool half, for example, in order to prevent the first nonwoven material layer from slipping or shifting relative to the second nonwoven material layer and/or being removed with the core element when the mold tool is first opened. Advantageously, this ensures that during the subsequent joining process the first nonwoven partial shell and the second nonwoven partial shell are aligned and oriented as desired. For example, it is conceivable that a portion of the first nonwoven material layer protruding from the mold tool is tied to an outer surface of the first mold tool half, for example via an eyelet or other form-fitting means, to ensure that the first nonwoven material layer does not become detached from the first mold tool half when the first mold tool half is spaced apart from the second mold tool half. It is also conceivable that the first nonwoven material layer and/or the first nonwoven partial shell is fixed to the first mold tool half at least temporarily by means of at least one adhesive point, by means of a vacuum and/or by means of a clamping frame.

Expediently, the first nonwoven partial shell and the second nonwoven partial shell are welded together by means of a residual heat of the first nonwoven partial shell and/or the second nonwoven partial shell. For this purpose, it is particularly provided that the first mold tool half and the second mold tool half are rejoined promptly after removal of the core body, in particular are pressed together along a pressing direction. In this way, it is advantageously possible to use the residual heat in the first nonwoven partial shell and the second nonwoven partial shell to form a materially bonded joint between the first nonwoven partial shell and the second nonwoven partial shell, in particular via collar elements of the, for example, pot-shaped first nonwoven partial shell and of the second nonwoven partial shell, the collar elements being arranged between end faces or sections of the first mold tool half and the second mold tool half, which in particular form at least part of a frame of the mold tool, during the pressing operation. By joining by means of the residual heat, it is advantageously possible to realize a homogeneously pronounced materially bonded joint weld which has been found in particular to be a particularly elastic, that is to say non-brittle, joint. In addition, pressing allows the realization of welding geometries which would not be possible by means of infrared welding. Preferably, less than 120 seconds elapse between the removal of the core body and the welding by pressing the first nonwoven partial shell and the second nonwoven partial shell onto each other by means of the mold tool, preferably less than 90 seconds and more preferably less than 40 seconds. By the joining taking place immediately after the forming, an overall cycle time can be advantageously reduced.

It is also conceivable that the first nonwoven partial shell and/or the second nonwoven partial shell are brought to the necessary residual heat and welded together by means of a heating process, which is preferably interposed.

Preferably, the first nonwoven partial shell and the second nonwoven partial shell are warmed up or heated in such a way that the expected residual heat after the molding process is sufficient to realize the material bond via the binder in the first nonwoven partial shell and the second nonwoven partial shell. Preferably, the bond is supported at least by plasticizing and/or interlocking of the individual fibers or elements. Preferably, the bond is realized by the nonwoven fibers alone, without the use of a binder therefor.

Furthermore, it is conceivable that a region of the materially bonded joint between the first nonwoven partial shell and the second nonwoven partial shell has a structure and/or an embossing, within the flange section. In this way, the joint strength between the first nonwoven partial shell and the second nonwoven partial shell can be further improved and/or optimized for the particular application.

In particular, it is provided that the first mold tool half and the second mold tool half and/or the core body is made of metal, in particular of aluminum and/or steel. In particular, in comparison with mold tool halves made of plastic, the production of the first mold tool half and the second mold tool half and of the core body element proves to be advantageous in that a first or second mold tool half or a core body made of metal can withstand the forces arising during compression.

Preferably, it is provided that the first nonwoven partial shell and the second nonwoven partial shell are joined together via a flange section projecting from the later hollow profile component, the flange section projecting with a length of between 0.5 mm and 10 mm, preferably between 0.5 mm and 6 mm and more preferably between 0.5 mm and 3 mm, and/or having a thickness which has a value between 0.01 mm and 2 mm, preferably between 0.05 mm and 1.5 mm and more preferably between 0.5 mm and 1 mm. Accordingly, it is possible to advantageously realize a flange section which is comparatively narrow, in particular in comparison with those known from alternative methods for producing half-shell elements made of nonwoven material. Accordingly, it is possible to realize a component which is economical in terms of construction space and has a comparatively small overhang on the outer circumference, which serves only to provide the connection between the two components and does not serve any further functional purpose on the respective hollow body profile component. Therein, it is particularly provided that the thickness of the flange section is influenced by a thickness of the first nonwoven material layer and/or second nonwoven material layer, the material of the first nonwoven material layer and the second nonwoven material layer and/or a pressure used during pressing for joining the first nonwoven partial shell and the second nonwoven partial shell.

Preferably, it is provided that the first nonwoven partial shell and the second nonwoven partial shell are joined together via a flange section projecting from the later hollow profile component, wherein the flange section
- projects with a length of between 0.5 mm and 10 mm, preferably between 0.5 mm and 6 mm and more preferably between 0.5 mm and 3 mm and/or
- has a thickness which has a value of between 0.01 mm and 3 mm, preferably between 0.05 mm and 2.5 mm and more preferably between 0.5 mm and 2 mm.

Expediently, the joining is realized at a temperature between 50 and 500° C., preferably between 80° C. and 400° C. and more preferably between 100° C. and 300° C. and/or at a pressure between 1 and 30,000 kg/cm$^2$, preferably between 1 and 25,000 kg/cm$^2$ and more preferably between 1 and 20,000 kg/cm$^2$. Particularly preferably, it is provided that the pressure for forming and the pressure for joining substantially correspond to each other. Alternatively, it is also conceivable that the pressure for forming is greater or less than the pressure for joining in the mold tool. The temperature between 100° C. and 300° C. ensures that for the majority of the binders in the first nonwoven fabric layer and the second nonwoven fabric layer, the latter is liquid during the joining process in order to realize the materially bonded joint. Further, it is provided that the first nonwoven fabric layer and/or the second nonwoven fabric layer are heated in the oven such that the residual heat after forming is sufficiently high for joining.

In particular, it is provided that the first nonwoven material layer and/or the second nonwoven material layer is produced from a nonwoven the first nonwoven material layer and/or the second nonwoven material layer is produced from a nonwoven having a grammage between 1 and 2500 g/m$^2$, preferably between 100 and 2000 g/m$^2$, and more preferably having a grammage between 700 g/m$^2$ and 950 g/m$^2$. In particular for a grammage between 400 g/m$^2$ and 950 g/m$^2$, it is advantageously possible to realize the lowest possible tolerances with respect to the shape tanning of the hollow profile component.

In particular, the first nonwoven material layer and/or the second nonwoven material layer is produced from a nonwoven material having a grammage between 400 g/m² and 950 g/m² or even of substantially 500 g/mm².

In particular, it is provided that a structured course is realized in the first nonwoven partial shell and/or the second nonwoven partial shell during forming. In this way, it is advantageously possible to realize, for example, grooved channels and/or the like on the circumference of the hollow body component, which can, for example, provide corresponding dimensional stability in the case of air guidance.

In particular, it is provided that the first nonwoven partial shell and/or the second nonwoven partial shell have a substantially pot-shaped course, the pot-shaped course being terminated by a collar element, in particular by collar elements on opposite sides (in a direction perpendicular to the preferred direction of the general course), these collar elements being provided for the first nonwoven partial shell and the second nonwoven partial shell to be joined together to form the flange section.

Another object of the present invention relates to a method for producing a hollow profile component, in particular a channel-shaped hollow profile component, from a foam material, comprising the steps:
  providing a first foam material layer and a second foam material layer,
  arranging the first foam material layer and the second foam material layer in a mold tool with a first mold tool half, a second mold tool half and a core body, wherein a formation of the first foam material layer, the second foam material layer and the core body is arranged between the first mold tool half and the second mold tool half, wherein the core body is arranged between the first foam material layer and the second foam material layer in the formation, and
  forming, in particular simultaneously forming, the first foam material layer and the second foam material layer in the mold tool to form a first foam material partial shell and/or a second foam material part shell. All the properties and advantages described for the method for producing the hollow profile component from the nonwoven material can be transferred analogously to the method for producing the hollow profile component from the foam material, and vice versa.

Another object of the present invention relates to a method for producing a hollow profile component, in particular a channel-shaped hollow profile component, from a foam material and a nonwoven material, comprising:
  providing a first foam material layer and a first non-woven material layer,
  arranging the first foam material layer and the first nonwoven material layer in a mold tool with a first mold tool half, a second mold tool half and a core body, wherein a formation of the first foam material layer, the first non-woven material layer and the core body is arranged between the first mold tool half and the second mold tool half, wherein the core body is arranged between the first foam material layer and the first non-woven material layer in the formation, and
  forming, in particular simultaneously forming, the first foam material layer and the first nonwoven material layer in the mold tool to form a first foam partial shell and/or a first nonwoven partial shell. All the properties and advantages described for the method for producing the hollow profile component from the nonwoven material can be transferred analogously to the method for producing the hollow profile component from the foam material and the nonwoven material, and vice versa. In particular, it is envisaged that the first nonwoven partial shell and the first foam material layer are joined together in the mold tooling tool, in particular with the formation of a joint weld.

A further aspect of the present invention relates to a mold tool having a first mold tool half, a second mold tool half and a core body, the mold tool being designed to carry out a method according to the invention for producing a hollow profile component, in particular a channel-shaped hollow profile component, from a nonwoven material or a foam material. All the properties and advantages described for the method for producing the hollow profile component can be transferred analogously to the mold tool, and vice versa.

Another aspect of the present invention relates to a hollow profile component, wherein the hollow profile component is produced by a method according to the invention. All the advantages and properties described for the method can be transferred analogously to the hollow profile component and vice versa.

Another object of the present invention relates to a hollow profile component which is
  at least partially composed of a first nonwoven partial shell and a second nonwoven partial shell, wherein the first nonwoven partial shell and the second nonwoven partial shell are joined together via a homogeneously formed, materially bonded joint weld, or
  at least partially composed of a first foam partial shell and a second foam partial shell, the first foam partial shell and the second foam partial shell being joined together via a homogeneously formed, materially bonded joint weld. All of the advantages and properties described for the method can be transferred analogously to the hollow profile component and vice versa.

In particular, the hollow profile component differs from the prior art by the homogeneously formed materially bonded joint weld which preferably extends along the flange section. In this respect, the homogeneously formed joint weld differs in particular from the joint weld of the prior art, which are implemented by means of infrared welding and/or ultrasonic welding and have a bond strength which is discontinuous along their extension. By means of the homogeneous materially bonded joint along the joint weld, preferably produced by materially bonding pressing in the mold tool, it is possible in an advantageous manner to improve the joint, in particular the joint strength, between the first nonwoven partial shell and the second nonwoven partial shell. In particular, it has been found that under a tensile load between the first nonwoven partial shell and the second nonwoven partial shell, a significant amount of force is required to finally separate the first nonwoven partial shell from the second nonwoven partial shell, despite a tear, i.e. a partial separation. This is not the case with infrared illumination induced welds known in the prior art. Here, after an initial separation, a tensile force continuing to act on the nonwoven partial shells will quickly lead to a final separation.

Another object of the present invention is to provide a channel-shaped hollow profile component,
  which is at least partially composed of a first nonwoven partial shell and a second nonwoven partial shell, wherein the first nonwoven partial shell and the second nonwoven partial shell are joined together via a materially bonded joint weld in a flange section in which the first nonwoven partial shell and the second nonwoven partial shell contact each another, or
  which is formed at least partially from a first nonwoven partial shell shaped such that sections of the first nonwoven partial shell are joined together via a materially bonded joint weld in a flange section in which the sections of the first nonwoven partial shell contact each other. All properties and advantages described in connection with the method according to the invention apply analogously to the channel-shaped hollow profile component and vice versa.

The flange section preferably extends from the general course of the hollow profile component, in particular substantially perpendicularly. In this case, the general course of the hollow profile component is defined by the course of the side wall of the hollow profile component which delimits the channel of the channel-shaped hollow profile component. In particular, the general course in a plane perpendicular to the channel direction is meant.

Furthermore, it is preferably provided that the materially bonded joint weld is designed such that its geometric shape realizes a resistant and materially bonded joint between the first nonwoven partial shell and the second nonwoven partial shell. Alternatively, it is conceivable that the materially bonded joint is realized between two sections of the first nonwoven partial shell and/or the second nonwoven partial shell. For example, the first nonwoven partial shell may have a closed cross-section such that a first end may be joined to a second end of the first nonwoven partial shell.

Preferably, it is provided that the materially bonded joint weld comprises protrusions and/or indentations which are formed on an upper side and/or lower side of the flange section. Preferably, the protrusions and/or indentations are formed on only one side of the flange section. In particular, the protrusions and/or indentations form the joint weld, i.e. in the regions with protrusions and/or indentations in the flange section the materially bonded joint of the joint weld is formed. It has been found that, by means of appropriate protrusions and/or indentations, a durable and resistant materially bonded joint weld can be realized between the first nonwoven partial shell and the second nonwoven partial shell and/or between two different sections of the first nonwoven partial shell. In particular, it is provided therein that the protrusions and/or indentations are respectively formed on the first nonwoven partial shell and/or the second nonwoven partial shell. In particular, in the embodiments in which the indentations and/or protrusions are formed only on the first nonwoven partial shell, it is provided that the second nonwoven partial shell does not have any protrusions and/or indentations, for example on the underside of the flange section.

Alternatively, it is conceivable that both the first nonwoven partial shell and the second nonwoven partial shell have indentations and/or protrusions, preferably one indentation in each case being opposite a protrusion on the underside, in particular as viewed in a direction which is perpendicular to the extension plane of the flange section. In this way, it can be ensured that the flange section has a substantially constant thickness even if the surface of the upper side and/or lower side of the flange section is modulated in the longitudinal extension direction of the flange section. For example, the indentations and/or protrusions are arranged congruently in the direction extending perpendicularly to the plane of extension of the flange section at least in sections with respect to each other and/or offset with respect to each other. Furthermore, it is preferably provided that the protrusions and/or indentations on the upper side and the protrusions and/or indentations on the lower side alternate in longitudinal extension of the flange section. In particular, it is provided that a protrusion and an indentation each alternate, or a pair of protrusions and a pair of indentations each alternate.

Furthermore, it is preferably provided that the protrusions and/or indentations are spaced apart from each another and/or adjoin each another. In particular, it has surprisingly been found that a hollow profile component, in particular an airtight one, can also be realized when the protrusions and/or indentations are spaced apart from each other. Particularly preferably, the joint weld is interrupted in the longitudinal extension direction of the flange section.

Preferably it is provided that a ratio of an area of protrusions and/or indentations in the flange section to an area of the flange section assumes a value between 0.4 and 0.9, preferably between 0.6 and 0.85, and more preferably between 0.7 and 0.85. In particular, the joint weld is not formed over the entire surface of the flange section. It has been found that the realization of a full-surface joint weld is not necessary in order to realize a functional and operationally safe hollow profile component of the type in question.

BRIEF DESCRIPTION OF THE DRAWINGS

Further advantages and properties will be apparent from the following description of preferred embodiments of the subject matter of the invention with reference to the accompanying figures. It is shown in.

DETAILED DESCRIPTION OF THE PREFERRED EMBODIMENTS

Figure 1A:
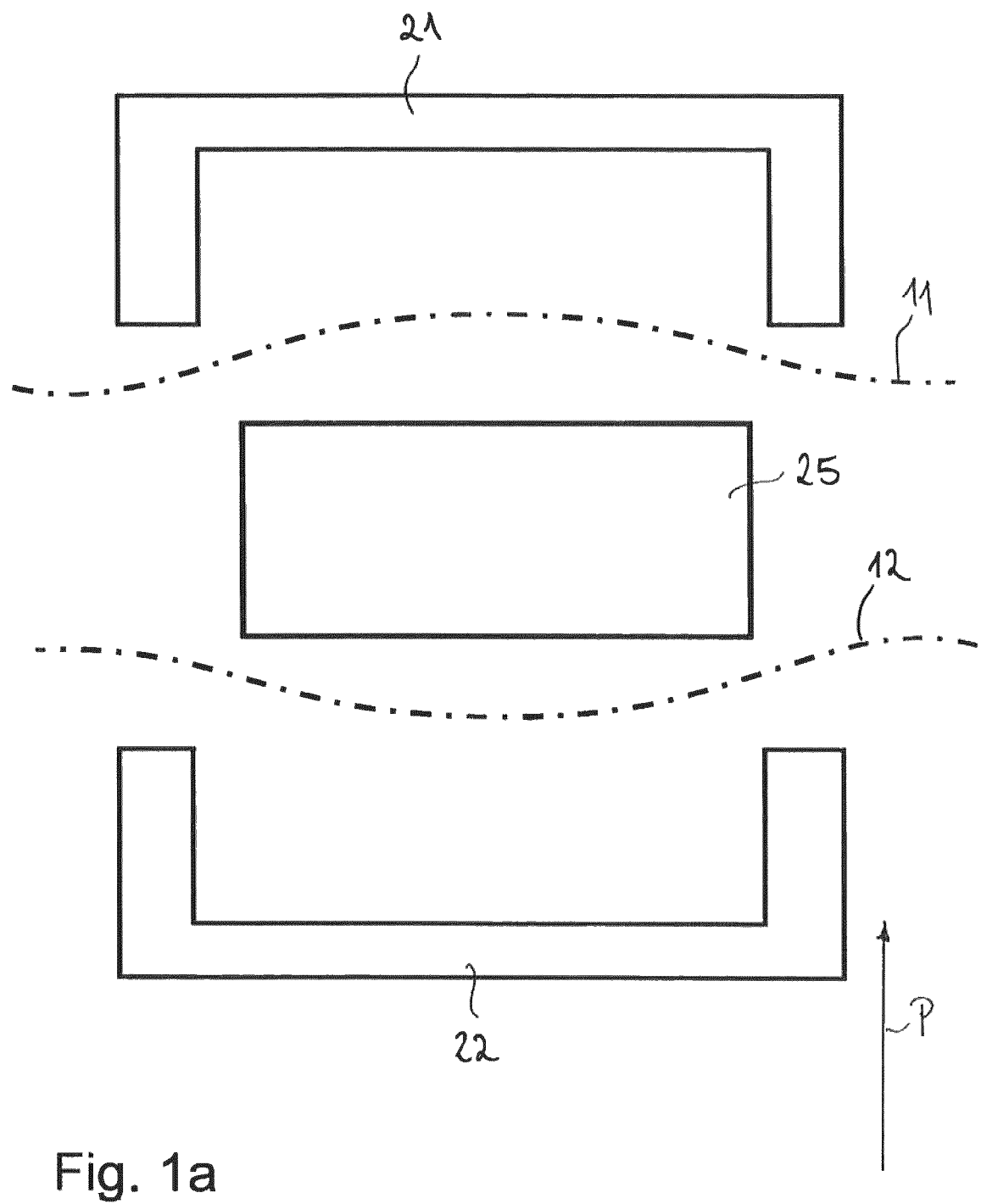
FIGS. 1a-1f are schematically a method for producing a hollow profile component according to a first preferred embodiment of the present invention.
Figure 1B:
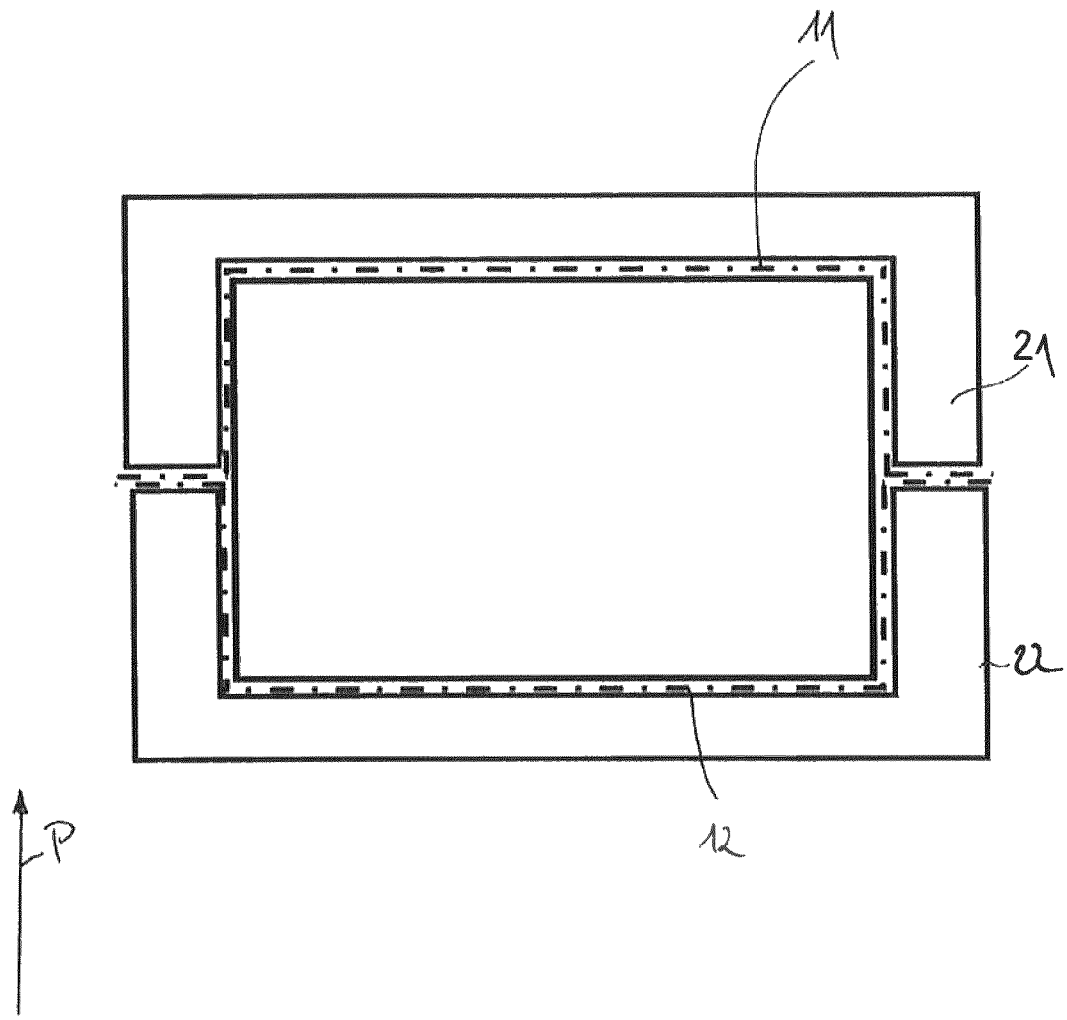

FIGS. 1a-1f schematically illustrate a method for producing a hollow profile component 1 according to a first preferred embodiment. Such hollow profile components 1, in particular channel-shaped hollow profile components 1, are used for example in vehicles for guiding gas, in particular air, or as footwell covers. Accordingly, such hollow profile components 1 have a hollow region 16 which has a closed periphery at least along a sectional plane. Preferably, such a hollow profile component 1 extends along a preferred direction, which may be straight or curved and in particular follows the general course of the channel-shaped hollow profile, and a closed wall for the hollow profile component 1 is provided in a plane extending perpendicular to the preferred direction. In contrast to the prior art, it is provided therein that the hollow profile component 1 is made of a nonwoven material. For this purpose, a first nonwoven material layer 11 and a second nonwoven material layer 12 are first provided. Preferably, the material or material composition of the first nonwoven material layer 11 corresponds to that of the second nonwoven material layer 12. However, it is also conceivable to provide a first nonwoven material layer 11 made of a first type of nonwoven material and a second nonwoven material layer 12 made of a second type of nonwoven material for forming a composite-like hollow profile component 1. For forming a hollow profile component 1, in particular for shaping the later hollow profile component 1, it is in particular provided that the first nonwoven material layer 11 and/or the second nonwoven material layer 12 are provided with a profile or a structure or a bulge in a mold tool. In particular, the mold tool is a pressing tool with a first mold tool half 21 and a second mold tool half 22, which are pushed together or pressed onto each other along a pressing direction P for the pressing operation. In order to simultaneously emboss and/or form the first nonwoven material layer 11 and the second nonwoven material layer 12, the mold tool further comprises a core body 25. The core body 25 serves as a punch and/or an abutment for both the first nonwoven material layer 11 and the second nonwoven material layer 12. In particular, the core body 25 is intended to serve as a placeholder for the later formed hollow region 16 in the hollow profile component 1. For this purpose, it is intended that a formation of the first nonwoven material layer 11, the second nonwoven material layer 12 and the core body 25 is arranged between the first mold tool half 21 and the second mold tool half 22. In this case, the formation of the first nonwoven material layer 11, the second nonwoven material layer 12 and the core body 25 is realized by a sandwich-like arrangement in which the core body 25 is arranged between the first nonwoven material layer 11 and the second nonwoven material layer 12. That is, the core body 25 is arranged between the first nonwoven material layer 11 and the second nonwoven material layer 12, in particular along the pressing direction P. For example, the formation is formed by first placing the second nonwoven material layer 12 on the second mold tool half 22 and then placing the core body 25 on the second nonwoven material layer 12 and placing the first nonwoven material layer 11 on the core body 25. In this context, it is in particular provided that the first nonwoven material layer 11 and the second nonwoven material layer 12 are dimensioned in such a way that they protrude in the formation with respect to the core body 25 in a plane perpendicular to the pressing direction P, in particular protrude on two opposite sides. In particular, the first nonwoven material layer 11 and the second nonwoven material layer 12 protrude with respect to the core body 25 to such an extent that during the forming process, that is to say in the closed state of the mold tool, the first nonwoven material layer 11 and the second nonwoven material layer 12 are not completely drawn into the mold tool, but protrude at least to the extent that, in the closed state, they either project out of the closed mold and/or are part of a frame formed by the first mold half 21 and the second mold half 22 along an outer circumference of the mold.

Preferably, the first nonwoven material layer 11 and the second nonwoven material layer are heated in an oven, a hot press and/or a radiant field before being placed in the mold tool as part of the formation. It is also conceivable that the first mold tool half and/or the second mold tool half are at least partially heated or tempered, for example in areas that are pressed against each other during pressing. In this way, the sections or regions of the first nonwoven layer and/or the second nonwoven layer that are later intended for joining can be kept warm for a longer time. By pressing together along the pressing direction P, it is then intended to carry out the forming process so that the first nonwoven material layer 11 becomes a first nonwoven partial shell 31, in particular first nonwoven half shell, and the second nonwoven material layer 12 becomes a second nonwoven half shell 32. The forming process or embossing process is graphically illustrated in FIG. 1b.

Figure 1C:
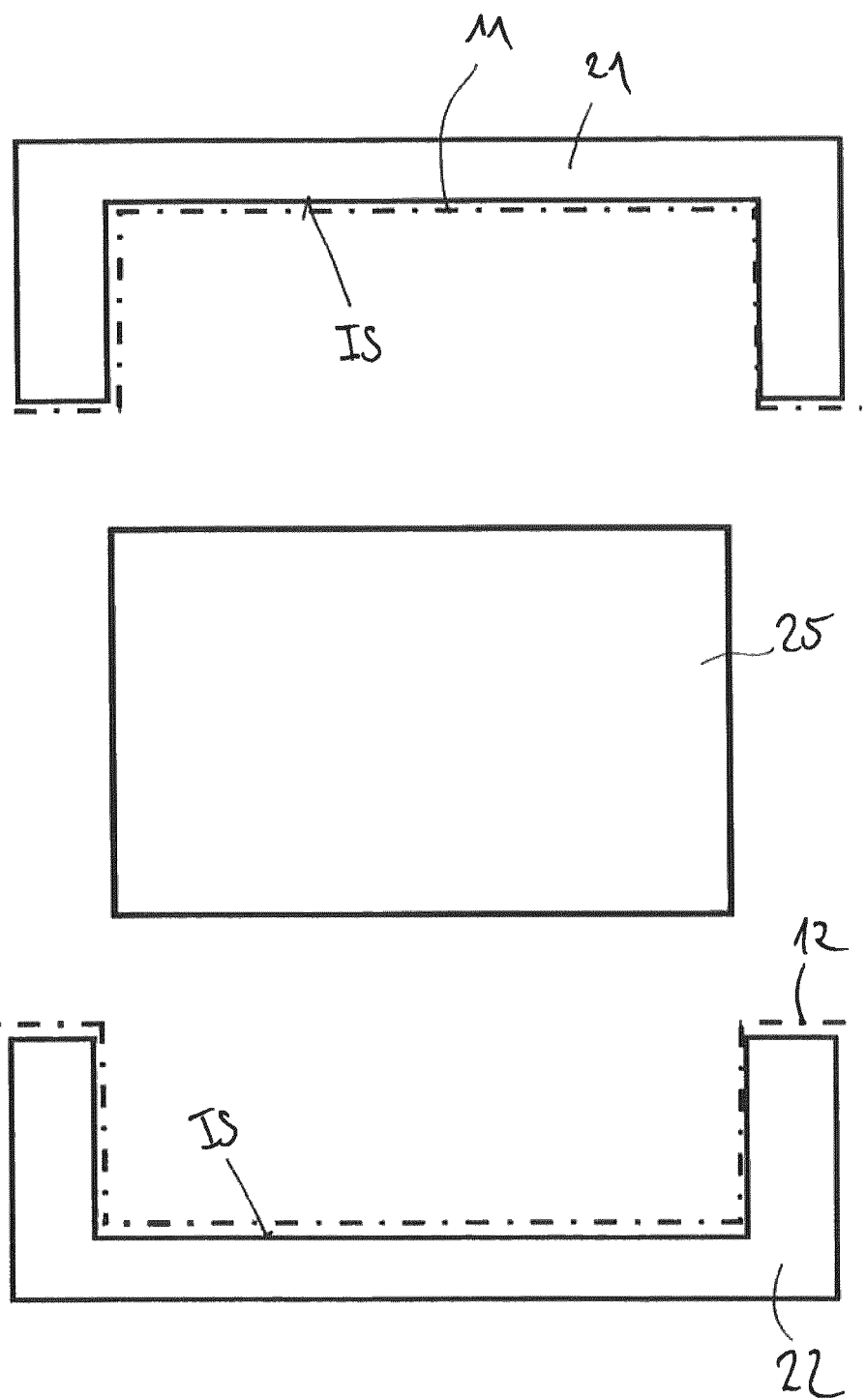

Following the embossing operation, it is provided that the first mold tool half 21 and the second mold tool half 22 are separated or spaced apart from each other again (see FIG. 1c). In this opened state, it is particularly provided that the first nonwoven partial shell 31 is adhered to the first mold half 21 and the second nonwoven partial shell 32 is adhered to the second mold half 22, so that easy removal of the core body element 25 is possible. In particular, it is provided that the first nonwoven partial shell 31 and/or the second nonwoven partial shell 32 have a cross-sectionally pot-shaped configuration. In the embodiment shown, the first nonwoven partial shell 31 and the second nonwoven partial shell 32 are formed in the same way, in particular with respect to a depth of the pot-shaped progression of the first nonwoven partial shell 31 and the second nonwoven partial shell 32. However, it is also conceivable that the first nonwoven partial shell 31 and the second nonwoven partial shell 32 differ with respect to their shape, for example the first nonwoven partial shell 31 differs from the second nonwoven partial shell 32 with respect to the depth of the pot-shaped progression. In particular, it is provided that an inner side of the first mold tool half 1 and/or an inner side of the second mold tool half 22 is completely covered with the first nonwoven material layer 11 and/or the second nonwoven material layer 12.

Figure 1D:
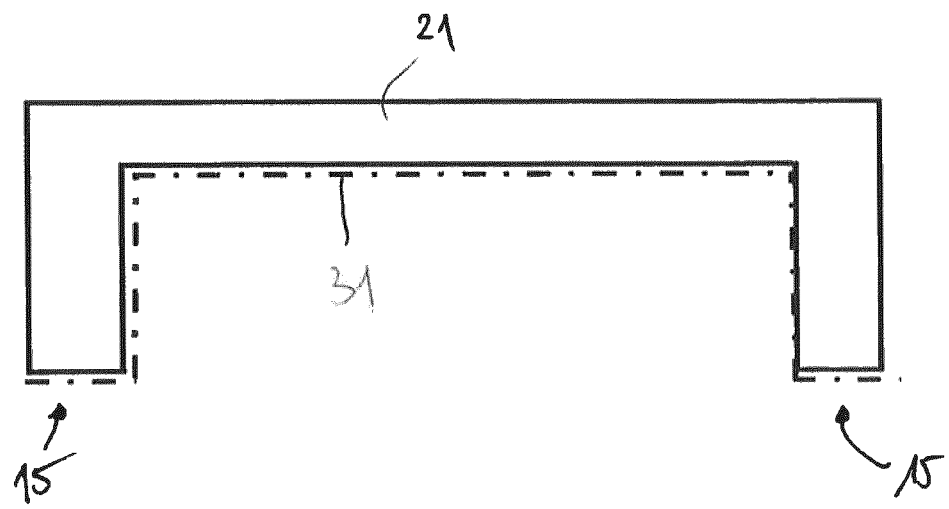
Figure 1D:
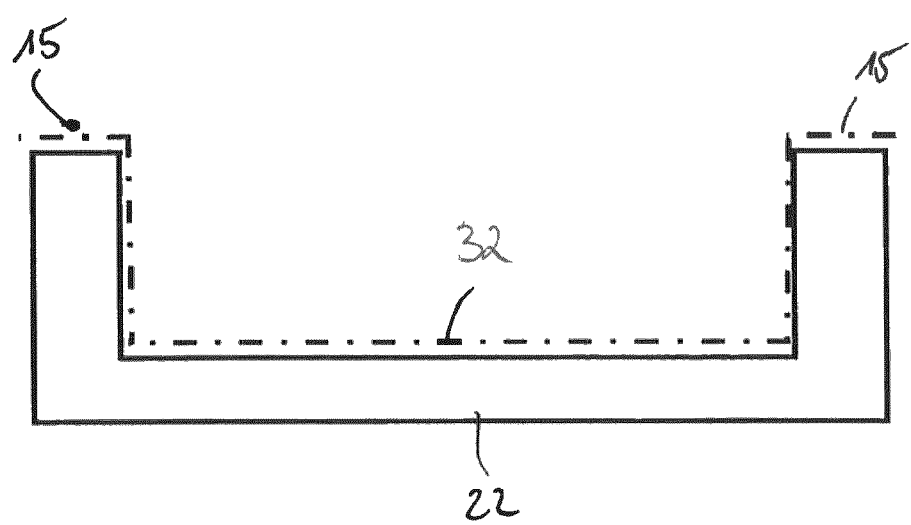
Figure 1E:
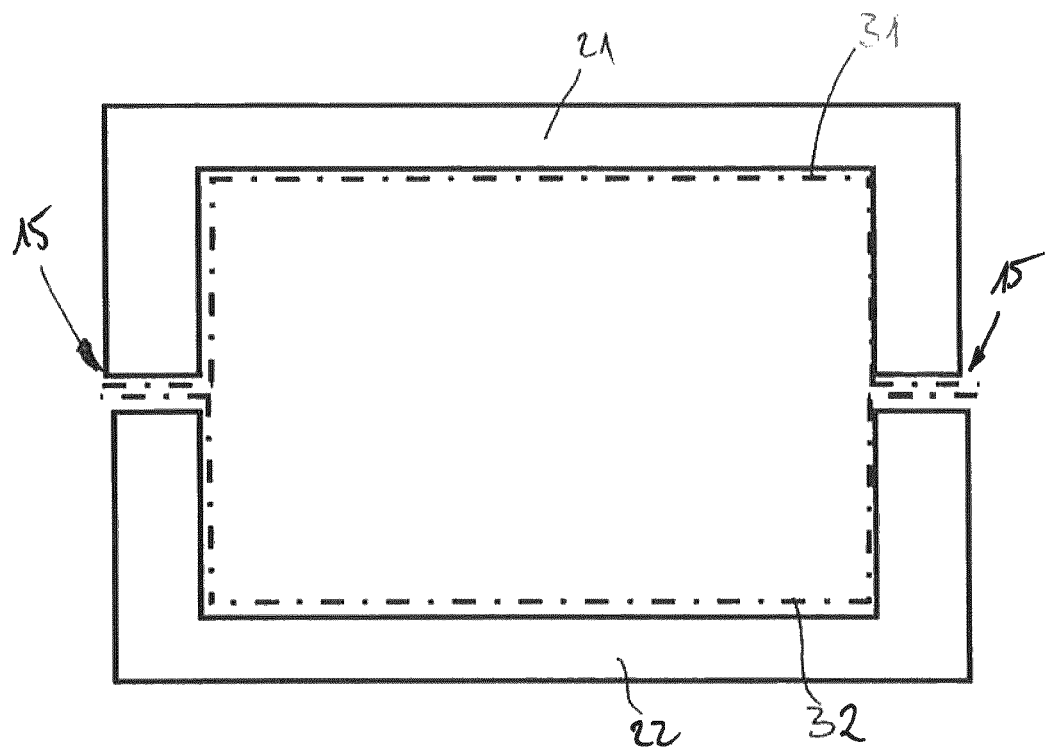
Figure 1F:
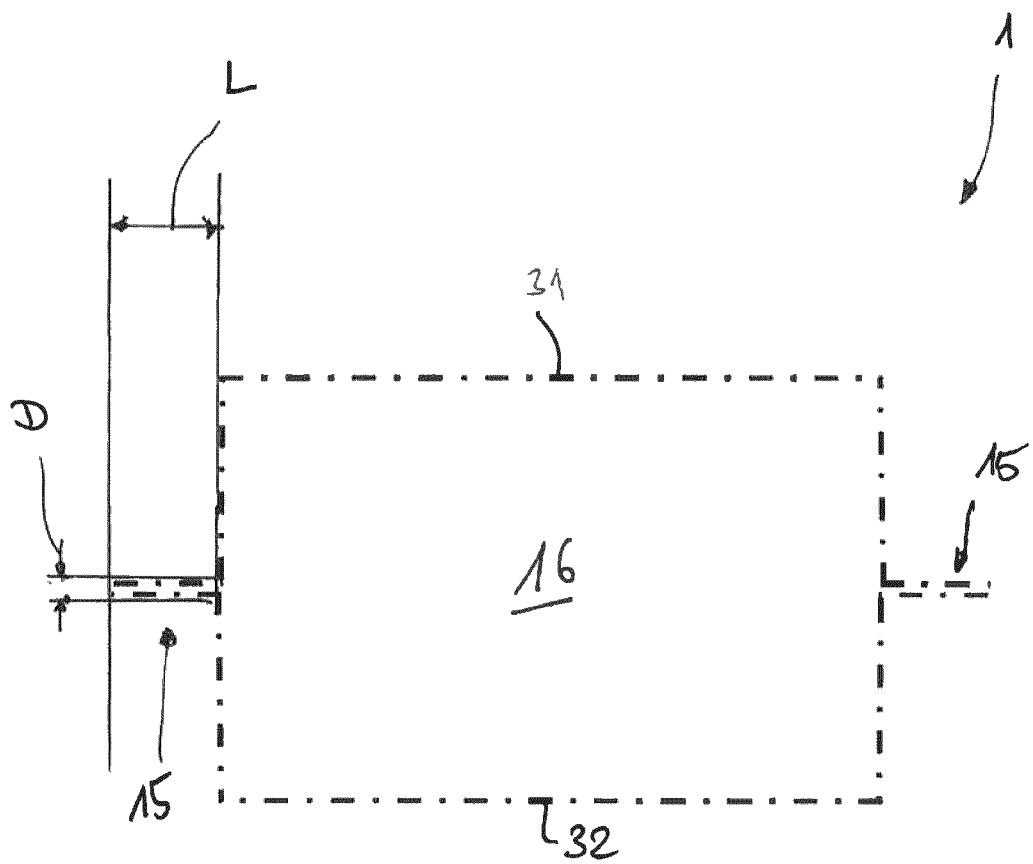

After removal of the core body 25, illustrated in FIG. 1d, it is provided that the first mold tool half 21 and the second mold tool half 22 are moved towards each other again, in particular within a fixed time interval, so that it is possible to use a residual heat of the first nonwoven partial shell 31 and the second nonwoven partial shell 32 to realize a connection via a common flange section 15 when the first nonwoven partial shell 31 is pressed against the second nonwoven partial shell 32 again (see FIG. 1e). In particular, it is provided that the first nonwoven partial shell 31 and the second nonwoven partial shell 32 each comprise a collar element, which are joined and/or welded together during this pressing operation to form the flange section 15, which preferably projects vertically from the manufactured hollow profile component 1. In this regard, it is particularly provided that the welding and pressing are realized by pressing opposite, in particular end-face, sections of the first mold tool half 21 and the second mold tool half 22 onto each other, while the collar elements of the first nonwoven partial shell 31 and the second nonwoven partial shell 32 are arranged on the otherwise directly adjacent end-face or opposite sections. Thus, in an advantageous manner, the joining process can also be realized in the mold tool, thereby simplifying and accelerating the manufacturing process. The manufactured hollow profile component 1 is shown in a sectional view in FIG. 1f. In addition, it has been found that comparatively narrow flange sections 15 can be realized by this joining process. In particular, it is possible to realize lengths L for the flange sections 15 which assume values between 0.5 mm and 10 mm, preferably between 0.5 mm and 6 mm and more preferably between 0.5 mm and 3 mm. Furthermore, it is provided that the formed flange section 15 through which the connection between the first nonwoven partial shell 31 and the second nonwoven partial shell 32 takes place has a thickness D which assumes a value of between 0.01 mm and 2 mm, preferably between 0.05 mm and 1.5 mm and more preferably between 0.5 mm and 1 mm.

Figure 2:
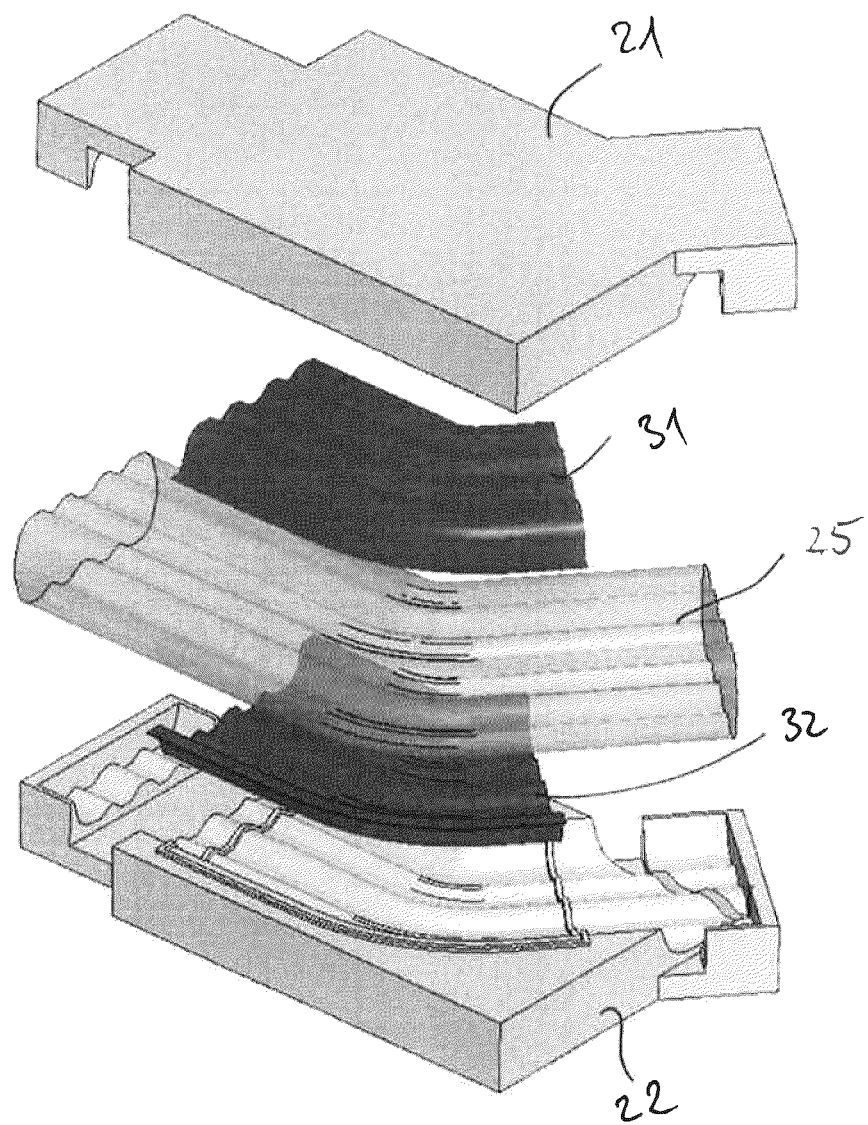
FIG. 2 is a schematic exploded view of a mold tool according to a preferred embodiment of the present invention, together with a first nonwoven partial shell and a second nonwoven partial shell.

In FIG. 2, a mold tool according to a preferred embodiment is shown in a schematic exploded view, wherein a formed first nonwoven partial shell 31 and a second 32 nonwoven partial shell are additionally shown. In particular, the mold tool of FIG. 2 is characterized in that the first mold tool half 21 and the second mold tool half 22 are profiled on their inner sides IS. This makes it possible, for example, to co-imprint a grooved and/or curved structure in the first nonwoven partial shell 31. In other words, it is preferably possible to impart a corresponding profiling to the manufactured hollow profile component 1 along its closed periphery by means of the corresponding design of the inner side IS of the molding tool.

Figure 3A:
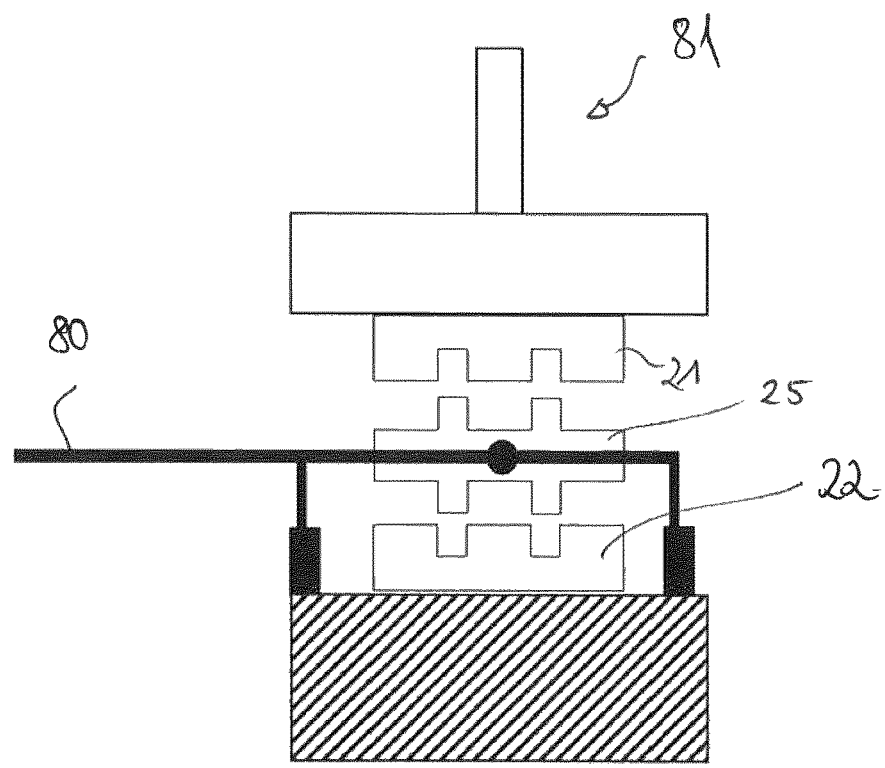
FIGS. 3a-3c are schematic representations of mold tools according to further preferred embodiments of the present invention.
Figure 3B:
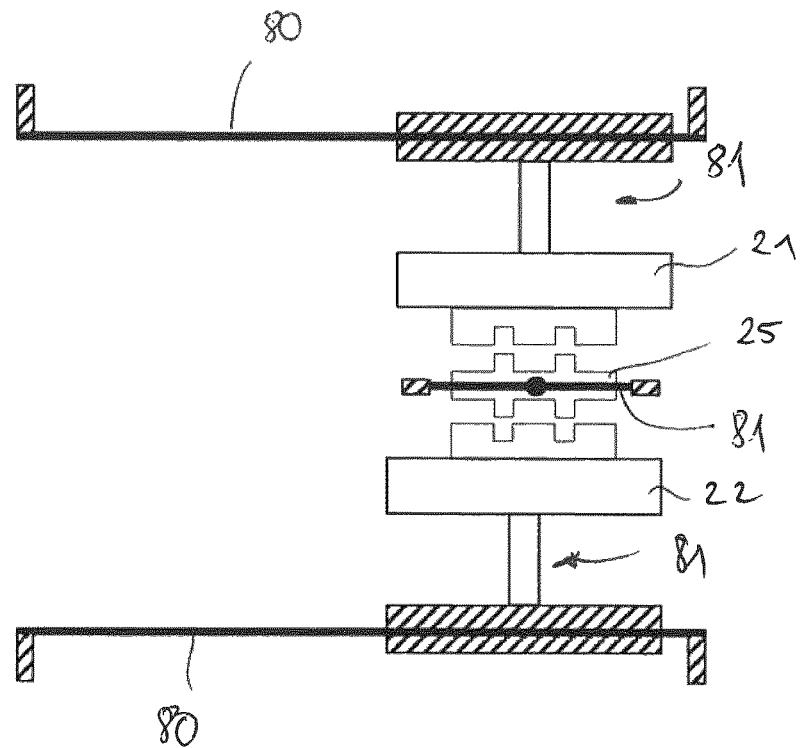
Figure 3C:
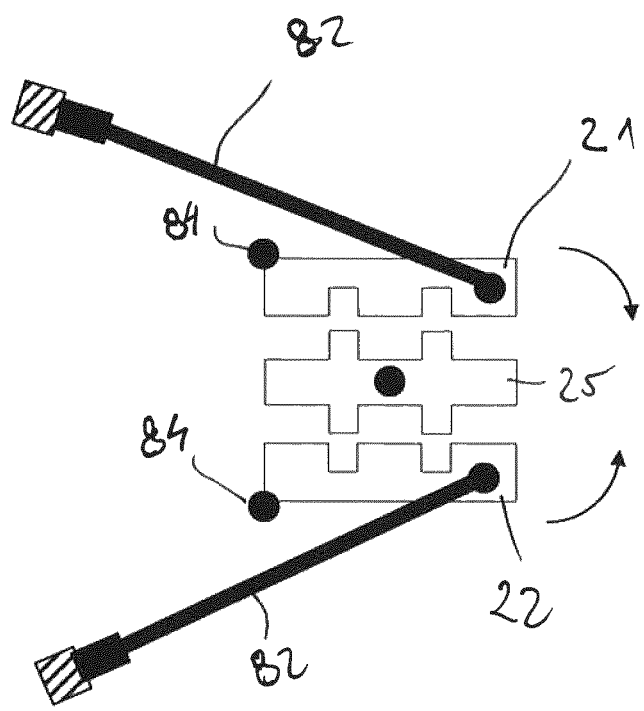

FIGS. 3a-3c show mold tools for carrying out a method for producing a hollow profile component 1 according to a further preferred embodiment of the present invention. In particular, in the embodiment example illustrated in FIG. 3a, it is provided that the second mold half 22 is arranged in a stationary manner and the core body 25 is mounted in a slidable manner, in particular on a rail 80. As a result, it is advantageously possible, preferably in an automated manner, to move the core body 25 laterally out of the region between the first mold half 21 and the second mold half 22 and/or into the region between the first mold half 21 and the second mold half 22. Furthermore, it is preferably provided that by means of a lifting device 81 the first mold half 21 can be raised and/or lowered in order to move the first mold half 21 towards the second mold half 22 and/or to move it away from the second mold half 22. This allows the mold tool to be moved in a corresponding manner for performing the pressing operation, in particular for forming and/or joining.

In the embodiment example shown in FIG. 3b, it is additionally provided that the first mold half 21 and/or the second mold half 22 are slidably mounted, in particular in each case on a rail 80. In this way, it is advantageously possible for the first mold tool half 21 and the second mold tool half 22 and/or the core body 25 to be displaceable, in particular to be transferable into a position in order to close and/or open the mold tool, in particular in order to realize a forming and/or joining of the first nonwoven material layer 11 and/or the second nonwoven material layer 12.

In FIG. 3c, the first mold half 21 and the second mold half 22 are pivotably mounted, in particular pivotably about a pivot point 84 on each of the first mold half 21 and/or the second mold half 22. For this purpose, in particular pivot arms 82 are provided, with which the mold tool can be opened and/or closed by a pivoting movement.

FIGS. 4a-4j illustrate various channel-shaped hollow profile components 1 according to further exemplary embodiments of the present invention. In particular, such channel-shaped hollow profile components 1 are generally shown which are composed of a first nonwoven partial shell 31 and a second nonwoven partial shell 32. The first nonwoven partial shell 31 and the second nonwoven partial shell 32 are joined together via a flange section 15 projecting sideways or laterally from the base body of the hollow profile body 1. In particular, a joint weld is implemented in this flange section 15, with which the first nonwoven partial shell 31 and the second nonwoven partial shell 32 are joined together, in particular are joined together by a material bond. In the embodiment example shown in FIG. 4a, the joint weld is realized in such a way that flat, in particular smooth, surfaces are formed on an upper side OS and/or on a lower side US of the flange section 15. In other words, no projections and/or protrusions are formed by the joint weld between the first nonwoven partial shell 31 and the second nonwoven partial shell 32.

Figure 4A:
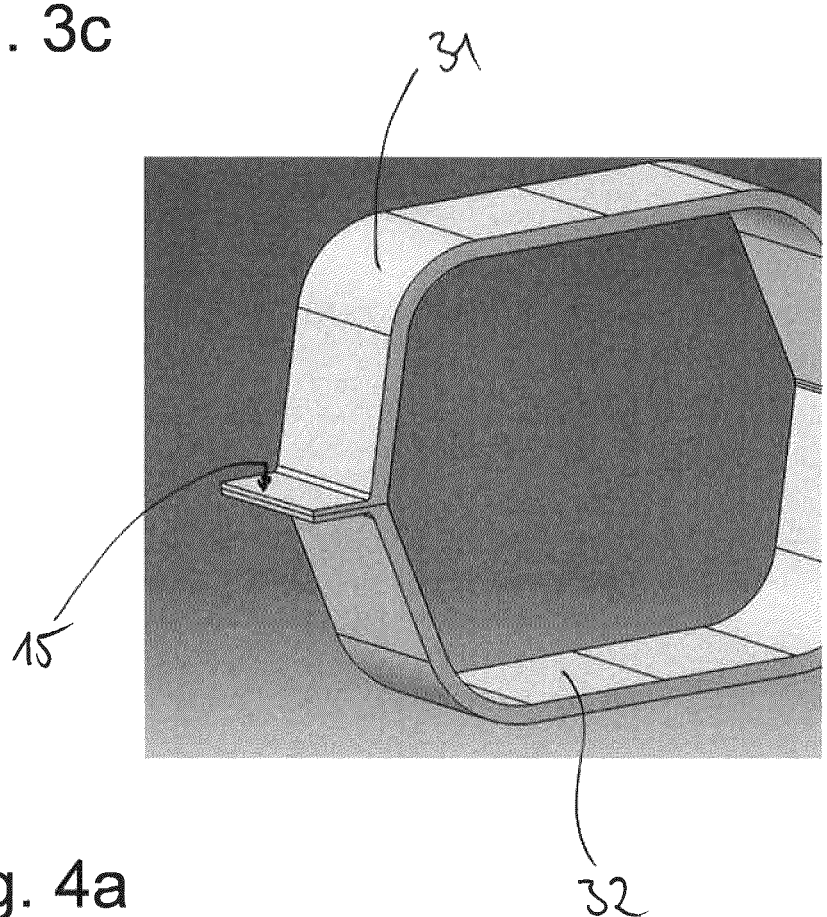
FIGS. 4a-4j are schematic representations of hollow profile components according to preferred embodiments of the present invention.
Figure 4B:
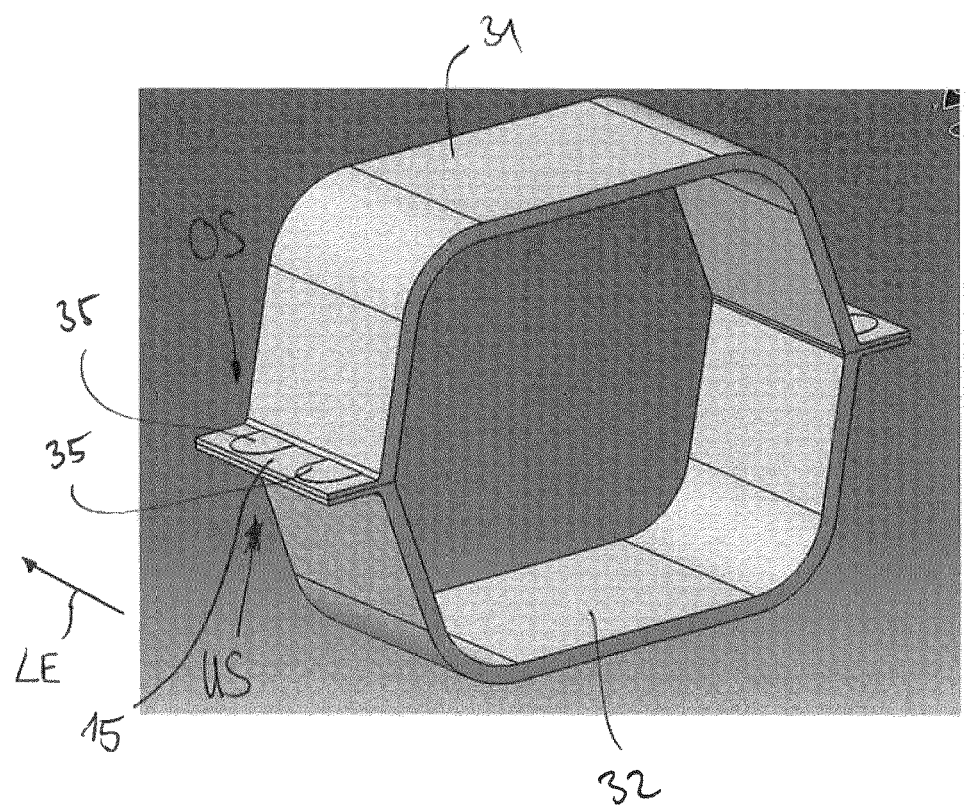
Figure 4C:
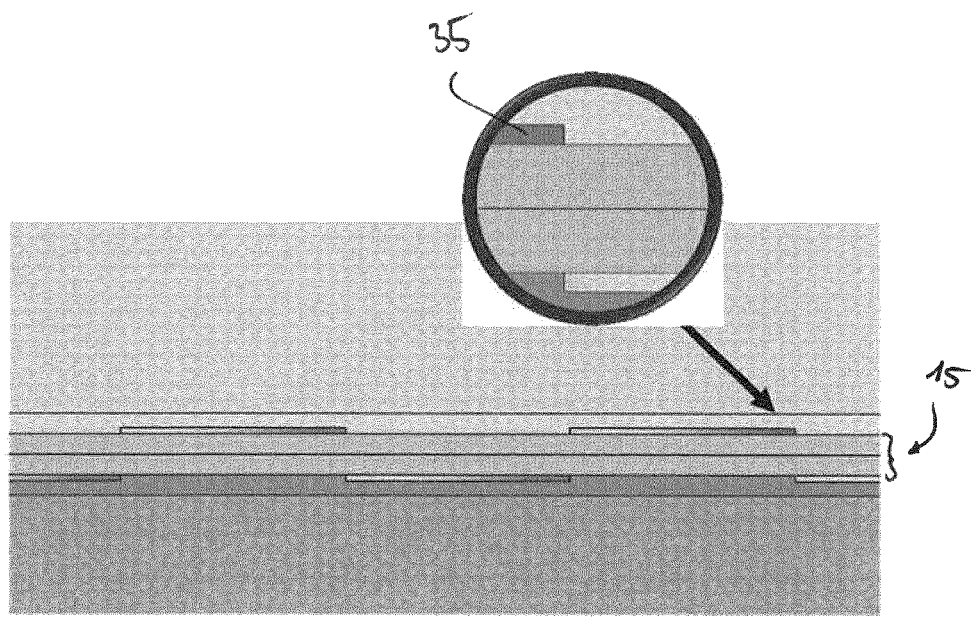

In the embodiment example shown in FIG. 4b, protrusions 35 are formed on the upper surface OS of the flange section 15. In this case, the protrusions 35 are spaced apart from each other in the longitudinal extension direction LE of the flange section 15. The exemplary protrusions 35 shown in FIG. 4b are shown in detail in FIG. 4c. In particular, it is provided that such protrusions 35 are formed by corresponding recesses or pockets on the first mold tool half 21 and/or the second mold tool half 22. In this regard, the protrusions 36 are respectively such material accumulations or material protrusions which protrude with respect to the upper surface of the flange section 15 and which are not formed by the first nonwoven material layer 21 and the second nonwoven material layer 22 being deformed together. Rather, the protrusion 35 or projection is pronounced on the first nonwoven component layer 31 without a corresponding indentation 36 being present on the second nonwoven component layer 32. Further, in this embodiment example, the flange section 15 is structured only on one side by the joint weld.

Figure 4D:
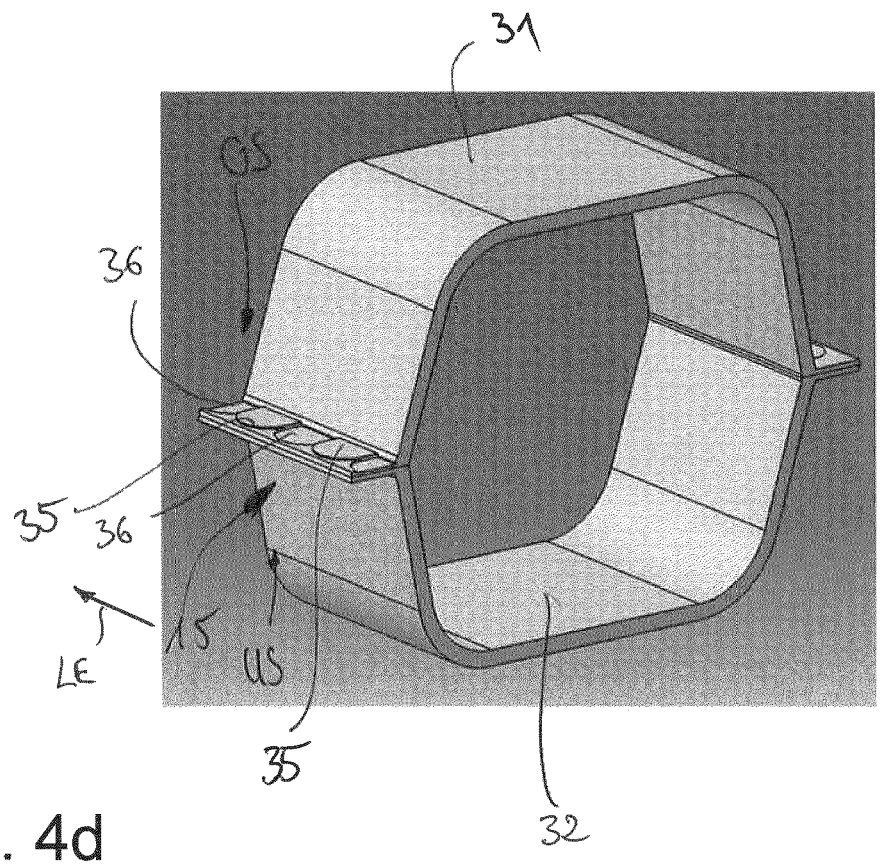

FIG. 4d shows an embodiment example of a joint weld in which protrusions 35 and indentations 36 are alternately arranged in the flange section 15 in the longitudinal extension direction LE. In particular, it is envisaged, for example, that indentations 36 and protrusions 35 are directly adjacent to each other, that is, no spacing is formed between protrusions 35 and protrusions 36. Alternatively, it is conceivable that equal spacing and/or different spacing is implemented between protrusions 35 and indentations 36. Preferably, the indentations 36 and/or protrusions 35 are formed as island-like or peninsula-like protrusions. In principle, elliptical and/or oval shapes for the indentations 36 and protrusions 35 are also conceivable. Furthermore, it is preferably provided that an indentation 36 and a protrusion 35 is formed in the first nonwoven partial shell 31 and the second nonwoven partial shell 32 opposite each other on the upper side and the lower side, respectively.

Figure 4E:
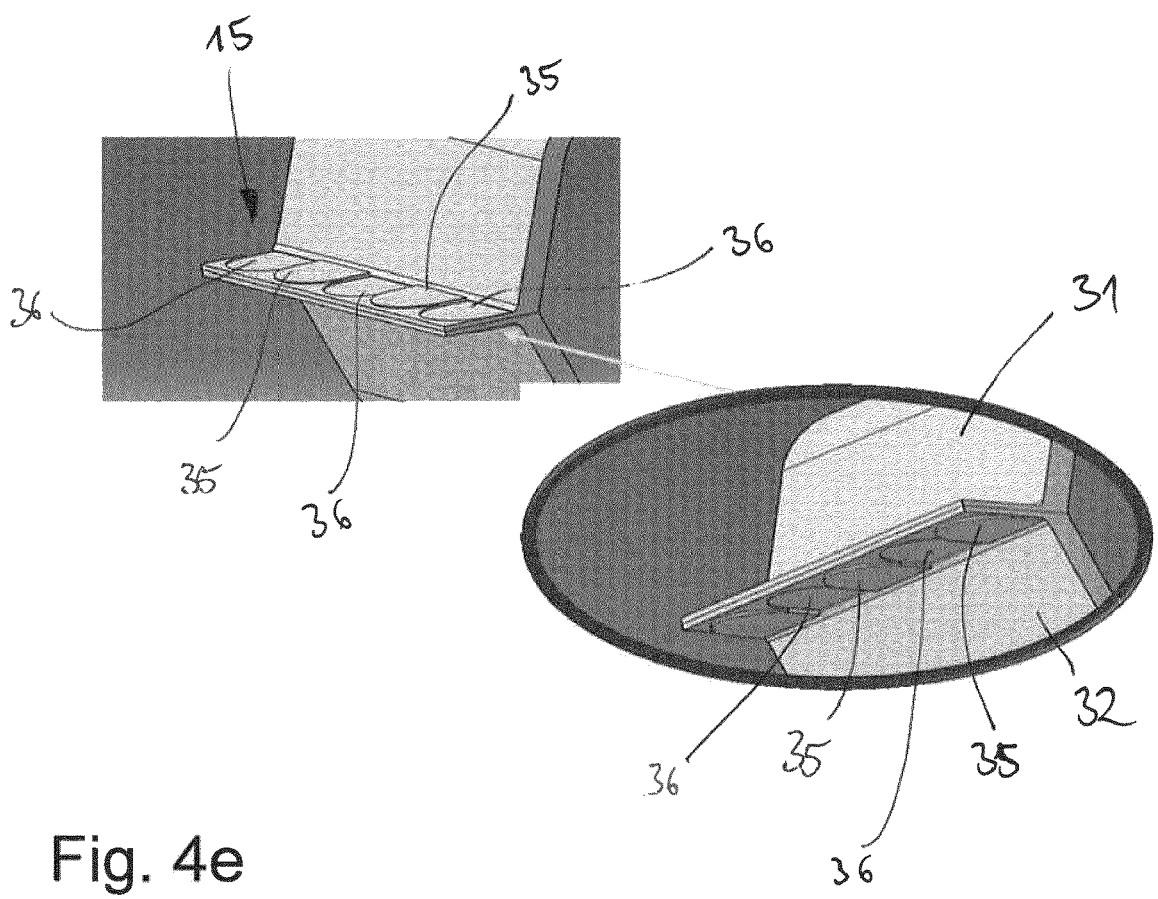
Figure 4F:
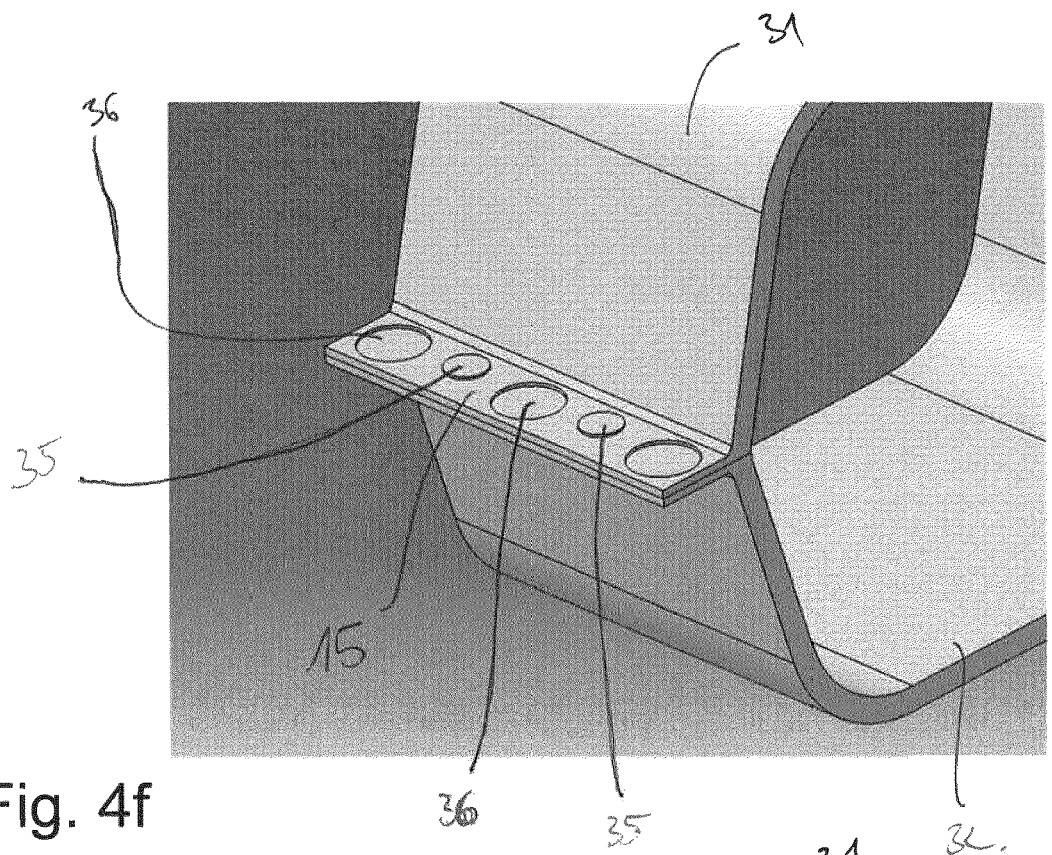

FIG. 4f shows a channel-shaped hollow profile 1 which differs substantially from that shown in FIG. 4e in that the protrusions 35 and/or indentations 36 take on circular shapes instead of the island-shaped shape. It is conceivable that the size for indentations 36 and/or protrusions 35 differ. Alternatively, it is conceivable that the sizes for protrusions 35 and/or indentations 36 are similar or correspond to each other. For example, the surfaces may match but the shapes may differ.

Figure 4G:
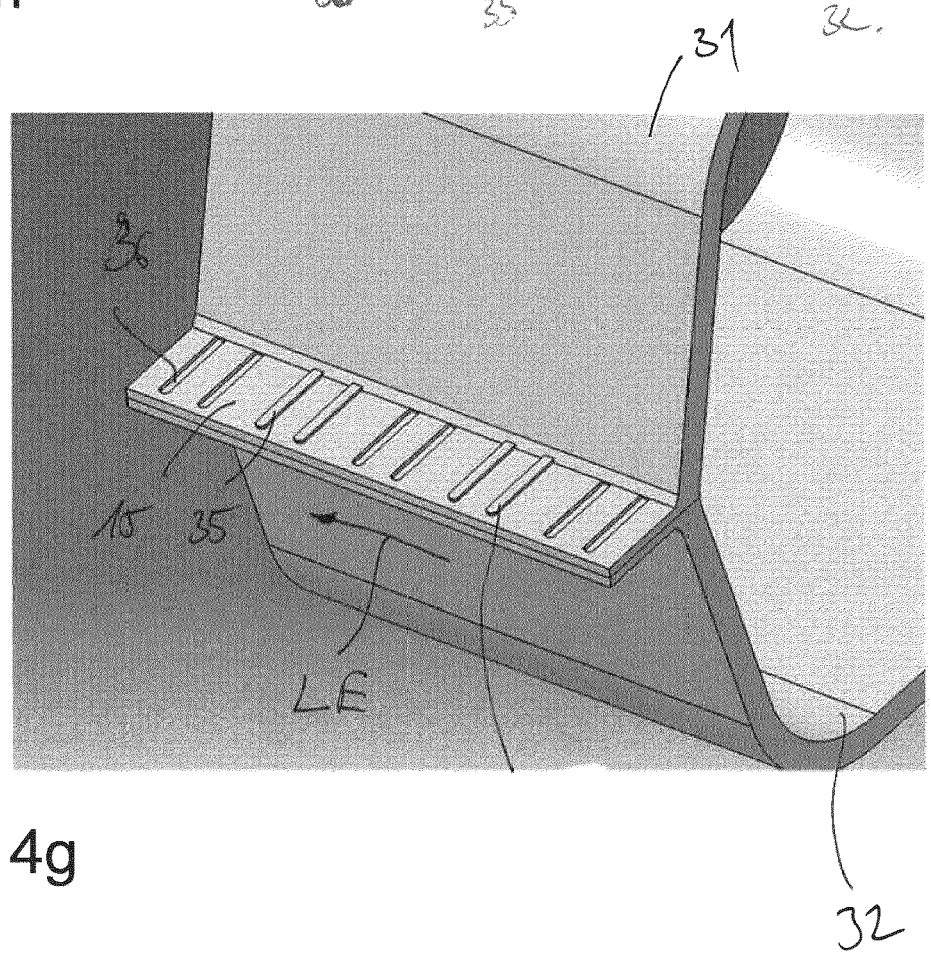

FIG. 4g shows a further embodiment example for a channel-shaped hollow profile or a channel-shaped hollow profile body, in which the flange section 15 has protrusions and/or indentations 36. The embodiment example of FIG. 4g differs from the embodiment examples of FIGS. 4e and 4f only in that the protrusions and/or indentations are assumed to run in a straight line. In this case, the rectilinear indentations and/or protrusions preferably extend perpendicularly and/or obliquely to the longitudinal extension direction of the flange section.

Figure 4H:
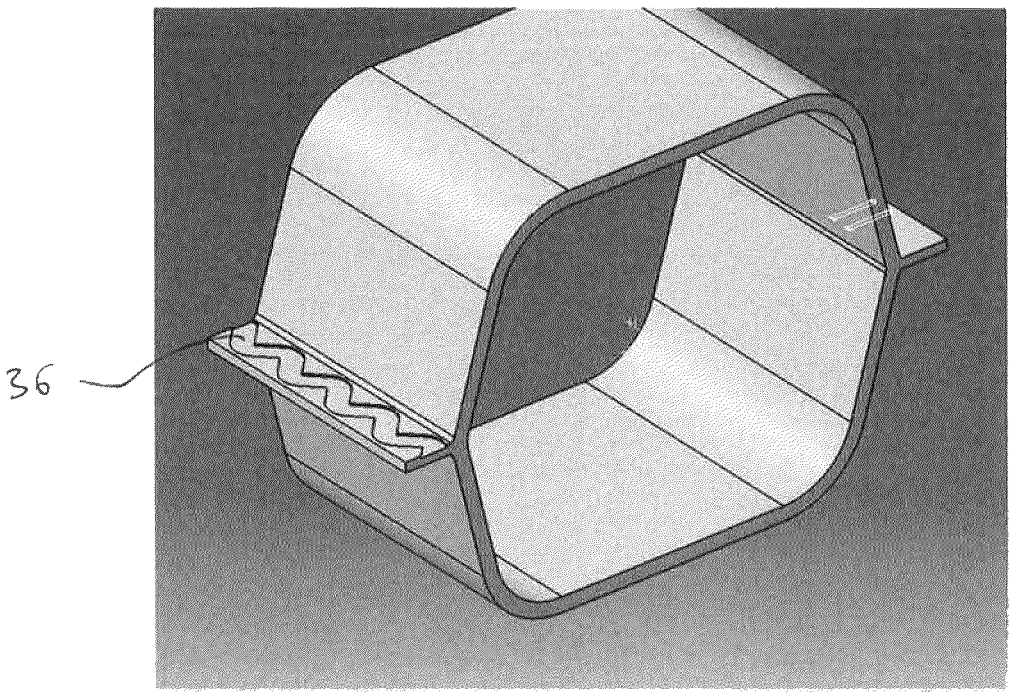

FIG. 4h illustrates an embodiment example of a channel-shaped hollow profile 1 in which an indentation 36 is formed in the form of a serpentine groove in the flange section 15. Alternatively, it is conceivable that the indentation is formed as a serrated groove in the flange section 15.

Figure 4I:
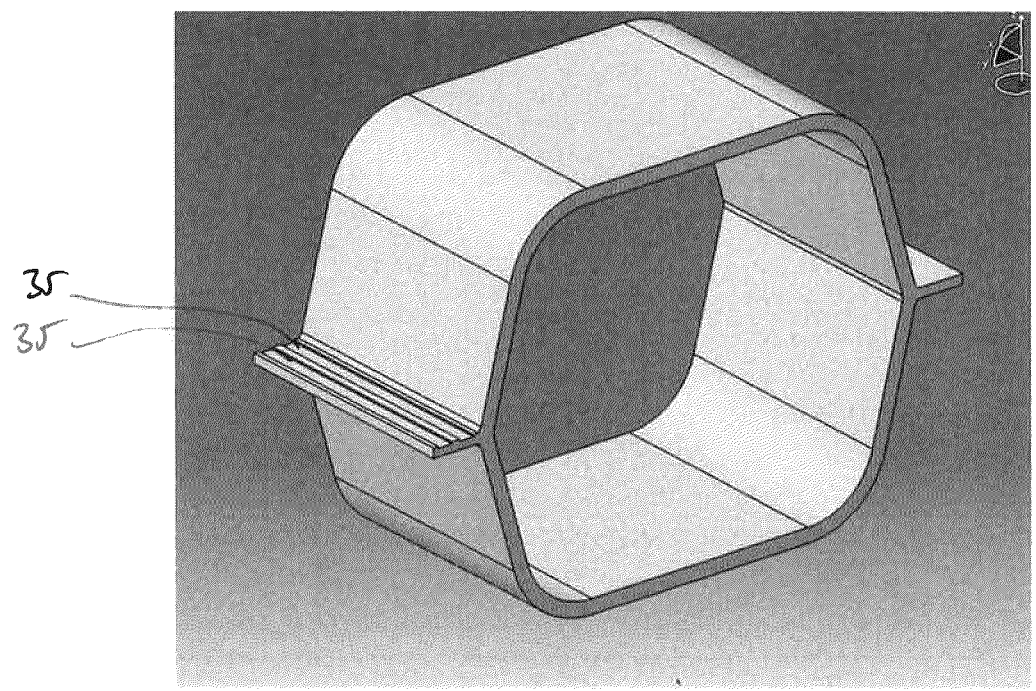

FIG. 4i shows a further example of an embodiment of a channel-shaped hollow profile body 1, in which indentations 36 are realized in the form of two groove-shaped cuttings extending parallel to one another, which extend in particular parallel to the longitudinal extension direction LE of the flange section 15.

Figure 4J:
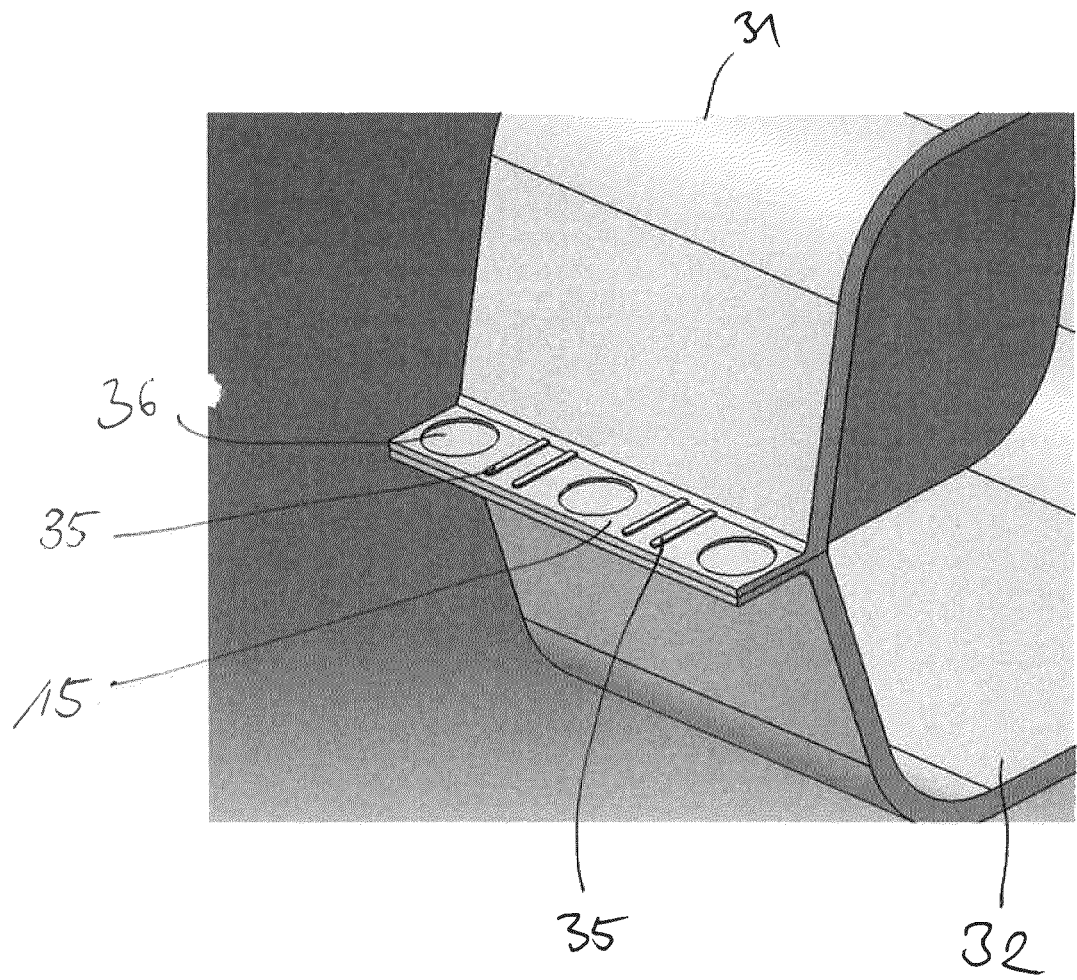

FIG. 4j shows another embodiment example of a channel-shaped hollow profile body 1, in which the joint weld differs from that in the preceding embodiments in that different geometric shapes are provided for protrusions 35 and indentations 36. In particular, it is provided here that the protrusions 35 are configured as rectilinear runs, while the indentations 36 are configured as circular indentations. Protrusions 35 and/or indentations 36 take the form of rectilinear struts or rods.

LIST OF REFERENCE SIGNS 1 hollow profile component
11 first nonwoven material layer
12 second nonwoven material layer
15 flange section
16 hollow region
21 first mold tool half
22 second mold tool half
31 first nonwoven partial shell
32 second nonwoven partial shell
35 protrusion
36 indentation
25 core body
80 rail
81 lifting device
82 pivot arm
84 pivot point
P pressing direction
IS inner side
L length
D thickness
LE longitudinal extension

The invention claimed is:

1. A method for producing a channel-shaped hollow profile component from a nonwoven material, comprising:
providing a first nonwoven material layer and a second nonwoven material layer;
arranging the first nonwoven material layer and the second nonwoven material layer in a mold tool having a first mold tool half, a second mold tool half and a core body, wherein a formation of the first nonwoven material layer, the second nonwoven material layer and the core body is arranged between the first mold tool half and the second mold tool half, and wherein the core body is arranged between the first nonwoven material layer and the second nonwoven material layer in the formation; and
simultaneously forming the first nonwoven material layer and the second nonwoven material layer in the mold tool to form a first nonwoven partial shell and/or a second nonwoven partial shell;
wherein the first nonwoven partial shell and the second nonwoven partial shell are joined together via a material bonded joint in a flange section in which the first nonwoven partial shell and the second nonwoven partial shell make contact, and wherein the material bonded joint includes an embossing, thereby producing the channel-shaped hollow profile component.

2. The method according to claim 1, further comprising:
joining the first and second nonwoven partial shells together in the mold tool subsequent to forming the first and second nonwoven layers.

3. The method according to claim 2, further comprising:
removing the core body from the mold tool prior to joining the first and second nonwoven partial shells.

4. The method according to claim 1, wherein the first nonwoven partial shell and the second nonwoven partial shell are welded together by a residual heat of the first nonwoven partial shell and/or the second nonwoven partial shell.

5. The method according to claim 1, wherein the first mold tool half and/or the second mold tool half and/or the core body comprise a metal.

6. The method according to claim 5, wherein the metal includes aluminum and/or steel.

7. The method according to claim 1, wherein the flange section projects from the hollow profile component with a length (L) of between 0.5 mm and 10 mm and/or has a thickness of between 0.01 mm and 3 mm.

8. The method according to claim 7, wherein the length is between 0.05 mm and 6 mm and/or the thickness is between 0.05 mm and 2 mm.

9. The method according to claim 8, wherein the length is between 0.5 mm and 3 mm and/or the thickness is between 0.5 mm and 2 mm.

10. The method according to claim 1, wherein the first nonwoven material layer and/or the second nonwoven material layer is produced from a nonwoven material having a grammage between 1 and 2500 g/m$^2$.

11. The method according to claim 10, wherein the grammage is between 100 g/m$^2$ and 2000 g/m$^2$.

12. The method according to claim 11, wherein the grammage is between 400 g/m$^2$ and 950 g/m$^2$.

13. A mold tool comprising the first mold tool half, the second mold tool half and the core body, wherein the mold tool is configured to carry out the method for producing the channel-shaped hollow profile component from the nonwoven material according to claim 1.

14. The channel-shaped hollow profile component according to claim 1, wherein the materially bonded joint weld comprises protrusions and/or indentations which are formed on an upper side and/or a lower side of the flange section.

15. The channel-shaped hollow profile component according to claim 14, wherein the protrusions and/or indentations are formed on a single side.

16. The channel-shaped hollow profile component according to claim 14, wherein the protrusions and/or the indentations on the upper side and the protrusions and/or the indentations on the lower side alternate in longitudinal extension of the flange section.

17. The channel-shaped hollow profile component according to claim 1, wherein the protrusions and/or the indentations are spaced apart from each another.

18. The channel-shaped hollow profile component according to claim 1, wherein the protrusions and/or the indentations adjoin each other.

19. The channel-shaped hollow profile component according to claim 1, wherein a ratio of an area of the protrusions and/or the indentations in the flange section to an area of the flange section is between 0.4 and 0.9.

20. The channel-shaped hollow profile component according to claim 19, wherein the ratio is between 0.6 and 0.85.

21. The channel-shaped hollow profile component according to claim 20, wherein the ratio is between 0.7 and 0.85.

22. The method according to claim 1, wherein the first nonwoven material layer comprises a first foam material.

23. The method according to claim 22, wherein the second nonwoven material layer comprises a second foam material.

24. The method according to claim 23, wherein the first and second foam materials are substantially similar.

* * * * *